(12) United States Patent
Tanigawa et al.

(10) Patent No.: US 8,228,857 B2
(45) Date of Patent: Jul. 24, 2012

(54) WIRELESS COMMUNICATION SYSTEM, WIRELESS COMMUNICATION TERMINAL, BASE STATION AND WIRELESS COMMUNICATION METHOD

(75) Inventors: Hironobu Tanigawa, Tokyo (JP); Yasuhiro Nakamura, Yokohama (JP); Nobuaki Takamatsu, Yokohama (JP)

(73) Assignee: Kyocera Corporation, Kyoto (JP)

( * ) Notice: Subject to any disclaimer, the term of this patent is extended or adjusted under 35 U.S.C. 154(b) by 422 days.

(21) Appl. No.: 12/442,654

(22) PCT Filed: Sep. 14, 2007

(86) PCT No.: PCT/JP2007/067992
§ 371 (c)(1),
(2), (4) Date: Mar. 24, 2009

(87) PCT Pub. No.: WO2008/038530
PCT Pub. Date: Apr. 3, 2008

(65) Prior Publication Data
US 2010/0085881 A1 Apr. 8, 2010

(30) Foreign Application Priority Data

Sep. 25, 2006 (JP) ................................ 2006-259076

(51) Int. Cl.
H04W 4/00 (2009.01)
(52) U.S. Cl. .................... 370/329; 370/341; 370/431
(58) Field of Classification Search ................ 370/329, 370/431, 464, 522; 455/422.1, 450
See application file for complete search history.

(56) References Cited

U.S. PATENT DOCUMENTS

| | | | |
|---|---|---|---|
| 6,125,148 A | 9/2000 | Frodigh et al. | |
| 6,438,113 B1 * | 8/2002 | Yang et al. | 370/329 |
| 6,831,910 B1 * | 12/2004 | Moon et al. | 370/342 |
| 6,882,841 B1 * | 4/2005 | Youn | 455/434 |
| 7,304,970 B1 * | 12/2007 | Ishikawa | 370/335 |

(Continued)

FOREIGN PATENT DOCUMENTS

CN 1289519 A 3/2001
(Continued)

OTHER PUBLICATIONS

Chinese language office action dated May 25, 2011 and its English language translation for corresponding Chinese application 200780035442.8 cites the U.S. patent application publication and foreign patent document above.

(Continued)

Primary Examiner — Hassan Kizou
Assistant Examiner — Roberta A Shand
(74) Attorney, Agent, or Firm — DLA Piper LLP (US)

(57) ABSTRACT

Provided is a wireless communication system for performing communication using a shared control channel that can be used in a predetermined period for each of a plurality of base stations and a plurality of traffic channels that can be adaptively allocated to each of a plurality of wireless communication terminals. The wireless communication terminal is provided with a channel requesting unit that requests the base station to allocate an individual control channel through the shared control channel and a communication control unit that performs control information communication by wirelessly connecting the individual control channel allocated from the base station. The base station is provided with a channel allocating unit that allocates one of the traffic channels as the individual control channel to be exclusively used for the wireless communication terminal when the request of individual control channel allocation is received from the wireless communication terminal through the shared control channel.

9 Claims, 4 Drawing Sheets

U.S. PATENT DOCUMENTS

| | | | |
|---|---|---|---|
| 7,333,825 B2 * | 2/2008 | Hamiti et al. | 455/515 |
| 7,590,389 B2 * | 9/2009 | Anderson | 455/67.7 |
| 2002/0172178 A1 * | 11/2002 | Suzuki et al. | 370/338 |
| 2003/0210665 A1 * | 11/2003 | Salmenkaita et al. | 370/330 |
| 2006/0056341 A1 * | 3/2006 | Takagi et al. | 370/328 |
| 2006/0098570 A1 | 5/2006 | Hadad | |
| 2006/0183429 A1 * | 8/2006 | Anderson | 455/67.13 |
| 2006/0268774 A1 * | 11/2006 | Kangas et al. | 370/329 |
| 2007/0173262 A1 * | 7/2007 | Rudolf et al. | 455/450 |
| 2007/0202904 A1 | 8/2007 | Cheng et al. | |

FOREIGN PATENT DOCUMENTS

| | | |
|---|---|---|
| JP | 04-286432 | 10/1992 |
| JP | 2001515301 A | 9/2001 |
| JP | 2002-271830 | 9/2002 |
| JP | 2003528506 A | 9/2003 |
| JP | 2003-289581 | 10/2003 |
| JP | 2006-180266 | 7/2006 |
| JP | 2006-197534 | 7/2006 |
| JP | 2006-253832 | 9/2006 |
| WO | 0172080 A1 | 9/2001 |
| WO | 2004112260 A2 | 12/2004 |
| WO | 2005089006 A1 | 9/2005 |

OTHER PUBLICATIONS

"Second-generation cordless telephone system standard RCR STD-28" ARIB (Association of Radio Industries and Businesses) pp. 1.1-1.4, Jan. 1993.

IEEE Computer Society & IEEE Microwave Theory & Techniques Society "WiMAX standard 802.16_2004" IEEE Standard for Local and metropolitan networks, pp. 1-5, Oct. 1, 2004.

Japanese language office action and its English language translation for corresponding Japanese application 2006259076 lists the references above, Apr. 2009.

* cited by examiner

WIRELESS COMMUNICATION SYSTEM, WIRELESS COMMUNICATION TERMINAL, BASE STATION AND WIRELESS COMMUNICATION METHOD

TECHNICAL FIELD

The present invention relates to a wireless communication system, a wireless communication terminal, a base station, and a wireless communication method.

The present application claims priority from Japanese Patent Application No. 2006-259076 filed on Sep. 25, 2006, the entire contents of which are incorporated herein by reference.

BACKGROUND ART

In recent years, a communication scheme, in which a channel can be assigned in a broad band and a channel band can vary at high speed, has been needed according to demand for communication speed or demand for securing a number of users with respect to mobile communication. As a method for realizing this, WiMAX (Worldwide Interoperability for Microwave Access: IEEE 802.16 series), for example, adopting an OFDMA (Orthogonal Frequency Division Multiple Access) scheme as a multiple access technology is attracting attention as a next-generation broadband mobile communication system.

WiMAX enables a plurality of terminals to refer to one broad frequency band and sets specific parts (frequency and timing) of the band that can be referred to as information provision parts (MAP) for allocating a communication band for every terminal. In the WiMAX, when a plurality of cells for covering a broad service area are arranged, the frequency and timing of MAPs are determined for every cell so that the MAP is not interfered with between the cells. In this case, since there is an upper limit in the number of frequency combinations to be acquired by the MAP, a cell design needs to be made so that cells where MAPs have the same frequency do not overlap in electric wave.

Non-Patent Document 1: "Second-generation cordless telephone system standard RCR STD-28" ARIB (Association of Radio Industries and Businesses)

Non-Patent Document 2: "WiMAX standard 802.16_2004" WiMAX FORUM

DISCLOSURE OF THE INVENTION

Problem to be Solved by the Invention

However, in order to validate the cell design as described above, an error range (including a temporal element) of an actual area for a cell area needs to be sufficiently small. Thus, in an environment where the error range of an area like an urban area tends to extend, the area must be sufficiently enlarged in consideration of an error. There is a problem in that the area extension causes transmission power or communication delay to increase and causes the influence of interference to occur easily due to the increasing number of users.

On the other hand, a method does not perform the cell design so as to avoid the problem regarding the cell design as described above. That is, there is a method for performing communication in which communication timing of control information of MAP, for example, (that is, use timing of a shared control channel) is different for every cell by performing distributed autonomous control between base stations using a shared control channel (CCH) that can be used in a predetermined period for each base station as in a conventional PHS (Personal Handyphone System). However, this method has a problem in that a period in which one base station can use its communication timing, (that is, a period in which the shared control channel can be used), is lengthened (a period of about 100 ms) since there must be provided control information communication timings corresponding to the maximum number of cells where inter-cell interference may occur. Consequently, there is a problem in that the use efficiency of wireless resources is degraded since a period in which a communication band can vary for one terminal is lengthened.

The present invention has been made in view of the above-described situation and an object of the invention is to realize mobile communication that dispenses with a cell design (to reduce transmission power and an area), can vary bands at high speed, and corresponds to a broad band/band variable/multiple users.

Means for Solving the Problem

To accomplish the above-described object, the present invention provides a wireless communication system for performing communication using a shared control channel that can be used in a predetermined period for each base station and a plurality of traffic channels that can be adaptively allocated to wireless communication terminals, the system including: the wireless communication terminals each including: a channel requesting unit that requests the base station to allocate an individual control channel through the shared control channel; and a communication control unit that performs communication of control information by wirelessly connecting the individual control channel allocated from the base station; and the base station including: a channel allocating unit that allocates one of the traffic channels as the individual control channel to be exclusively used for the wireless communication terminal when a request of individual control channel allocation is received from the wireless communication terminal through the shared control channel.

As a typical example, the channel allocating unit may have a function that further allocates a data communication traffic channel to the wireless communication terminal and transmits allocation information of the data communication traffic channel to the wireless communication terminal through the individual control channel, and the communication control unit may perform data communication with the base station by wirelessly connecting a data communication traffic channel indicated by the traffic channel allocation information obtained through the individual control channel.

As another typical example, the channel allocating unit may further allocate a data communication traffic channel to the wireless communication terminal, the wireless communication terminal may include a first determination unit that determines the channel quality of the data communication traffic channel allocated from the base station, and the communication control unit may transmit information for rejecting the data communication traffic channel allocated from the base station to the base station through the individual control channel on the basis of a determination result by the first determination unit.

As a preferred example, the base station may include a second determination unit that determines the channel quality of an upstream channel of each wireless communication terminal, and the channel allocating unit may determine an individual control channel and a data communication traffic channel to be allocated to the wireless communication terminal on the basis of a determination result by the second determination unit.

The present invention also provides a wireless communication terminal for performing communication using a shared control channel that can be used in a predetermined period for each base station and a traffic channel adaptively allocated from the base station, the terminal including: a channel requesting unit that requests the base station to allocate an individual control channel through the shared control channel; and a communication control unit that performs communication of control information by wirelessly connecting the individual control channel allocated from the base station.

As a typical example, the communication control unit may perform data communication with the base station by wirelessly connecting a data communication traffic channel indicated by the traffic channel allocation information obtained from the base station through the individual control channel.

As another typical example, it may include a first determination unit that determines channel quality of a data communication traffic channel allocated from the base station, wherein the communication control unit may transmit information for rejecting the data communication traffic channel allocated from the base station to the base station through the individual control channel on the basis of a determination result by the first determination unit.

The present invention also provides a base station including: a channel allocating unit that allocates, one of the traffic channels as an individual control channel to be exclusively used for the wireless communication terminal, when the individual control channel allocation request is received from the wireless communication terminal through the shared control channel.

As a typical example, the channel allocating unit may have a function that further allocates a data communication traffic channel to the wireless communication terminal and transmits allocation information of the data communication traffic channel to the wireless communication terminal through the individual control channel.

As a preferred example, the present invention may include a second determination unit that determines channel quality of an upstream channel of each wireless communication terminal, wherein the channel allocating unit determines an individual control channel and a data communication traffic channel to be allocated to the wireless communication terminal on the basis of a determination result by the second determination unit.

The present invention also provides a wireless communication method for performing communication using a shared control channel that can be used in a predetermined period for each base station and a plurality of traffic channels that can be adaptively allocated to each wireless communication terminal, the method including: a first step in which the wireless communication terminal requests the base station to allocate an individual control channel through the shared control channel; a second step in which the base station allocates one of the traffic channels as the individual control channel to be exclusively used for the wireless communication terminal when a request of individual control channel allocation is received from the wireless communication terminal through the shared control channel; and a third step in which the wireless communication terminal performs communication of control information by wirelessly connecting the individual control channel allocated from the base station.

Effect of the Invention

According to the present invention, in a wireless communication system for performing communication using a shared control channel that can be used in a predetermined period for each base station and a plurality of traffic channels that can be adaptively allocated to each wireless communication terminal, wireless resource (band) allocation can be controlled at a very high speed since one of the traffic channels is allocated as an individual control channel to be exclusively used for the wireless communication terminal and control information communication with the base station is performed through the individual control channel in a unit of one frame (5 ms). Accordingly, it is possible to realize mobile communication that dispenses with a cell design (to reduce transmission power and an area), can vary bands at high speed, and corresponds to a broad band/band variable/multiple users.

REFERENCE SYMBOLS

Figure 1:
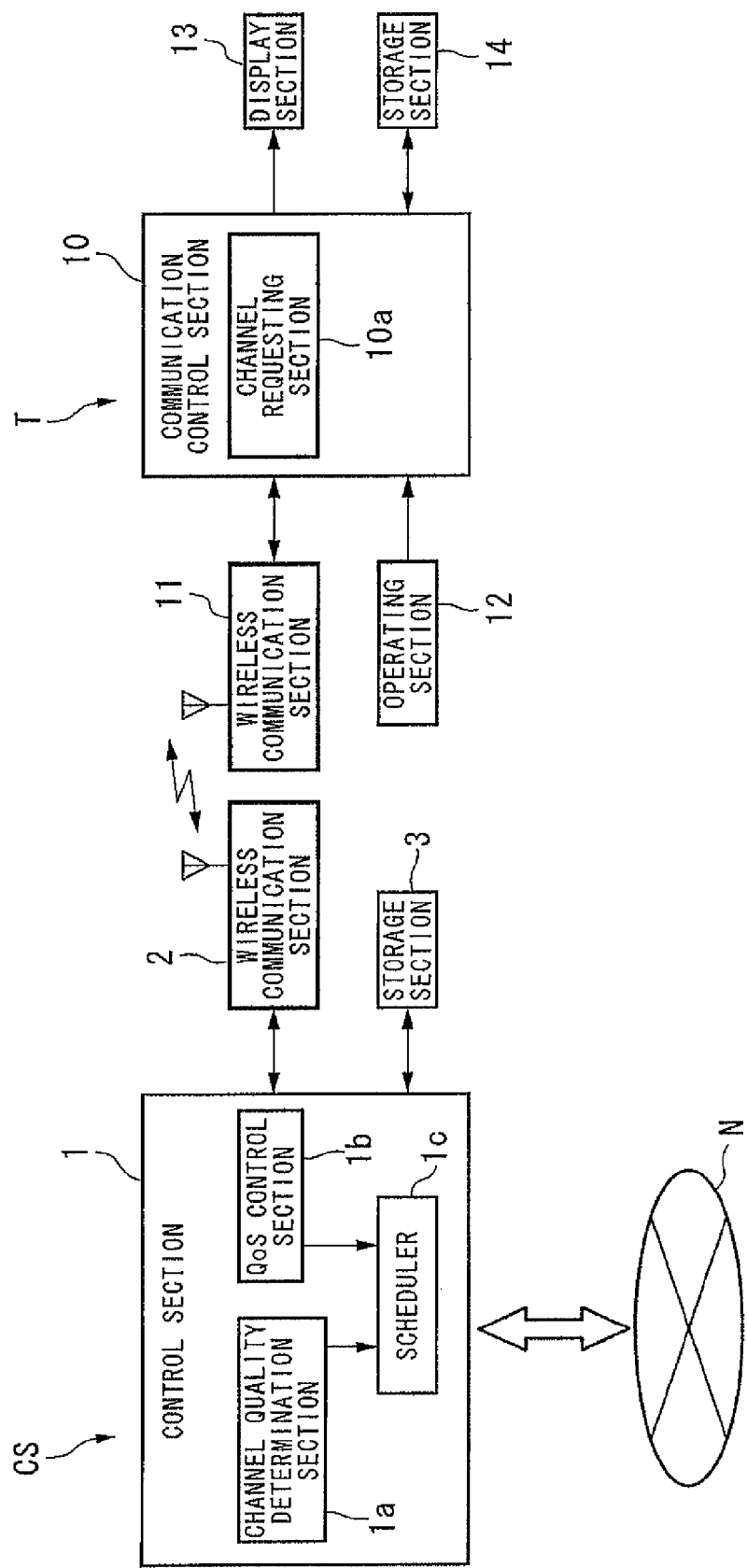
FIG. 1 is a configuration block diagram of a wireless communication system having a base station CS and a wireless communication terminal T according to one embodiment of the present invention.

CS: Base station
T: Wireless communication terminal (Terminal)
1: Control section
10: Communication control section
2, 11: Wireless communication section
3, 14: Storage section
1a: Channel quality determination section
1b: QoS control section
1c: Scheduler
12: Operating section
13: Display section
10a: Channel requesting section
N: Public line network

BEST MODE FOR CARRYING OUT THE INVENTION

Hereinafter, one embodiment of the present invention will be described in detail with reference to the drawings. FIG. 1 is a block diagram showing main part configurations of a wireless communication system, base station, and wireless communication terminal according to this embodiment. As shown in FIG. 1, the wireless communication system according to this embodiment is provided with a base station CS and a wireless communication terminal T.

For example, a plurality of base stations CS are arranged at regular distance intervals, but only one base station CS is illustrated in FIG. 1 for the sake of simplification of illustration. The base station CS wirelessly communicates with a plurality of wireless communication terminals T, but one wireless communication terminal T is illustrated in FIG. 1. In the following description, it is assumed that the wireless communication system adopts an orthogonal frequency division multiple access scheme (OFDMA) as a multiple access technology in addition to a time division multiple access scheme (TDMA) and a time division duplex scheme (TDD). In the following, the wireless communication terminal T is referred to as the terminal T.

As shown in FIG. 1, the base station CS is provided with a control section 1, a wireless communication section 2, and a storage section 3, wherein the control section 1 is provided with a channel quality determination section 1a (second determination unit), a QoS control section 1b, and a scheduler 1c (channel allocating unit) as its functional elements. The base station CS is connected to a public line network N, thereby communicating with another base station through the public line network N, a server connected to the public line network N, or the like.

In the base station CS, the control section 1 controls an overall operation of this base station CS on the basis of a base station control program stored in the storage section 3, a reception signal acquired through the wireless communication section 2, or an external signal acquired through the public line network N.

In the control section 1, the channel quality determination section 1a determines the quality of an upstream channel of each terminal T on the basis of a quality element of a channel acquired through the wireless communication section 2, and outputs the determination result to the scheduler 1c. When the quality of a channel on which communication is already in progress and a desired wave exists is determined as the quality element for determining the upstream channel quality, an SINR (Signal-to-Interference and Noise Power Ratio), an SNR (Signal to Noise Ratio), a CINR (Carrier-to-Interference and Noise Power Ratio), a CNR (Carrier to Noise Ratio), a communication rate after demodulation, etc. indicating the channel quality based on the strength of an interference wave to the desired wave is used.

When the quality of a channel which has not yet been used is determined in the case of channel allocation, an RSSI (Received Signal Strength Indicator), for example, indicating the strength of a signal received (carrier-sensed) on the channel, (that is, the strength of a signal serving as an interference wave) are used.

On the basis of an application operating in an upper layer protocol or a user priority of the terminal T connected to communication, the QoS control section 1b sends a request to the scheduler 1c by allocating a service class to the terminal T, allocating wireless resources according to the service class, or allocating communication timing. Details will be described later, but the above-described wireless resources are allocated in an OFDMA subchannel (hereinafter, simply referred to as a subchannel) unit and the communication timing is allocated in a TDMA slot (hereinafter, simply referred to as a slot) unit.

On the basis of the service class allocated to the terminal T connected to the communication, a queue status of packets between the base station CS and the terminal T, or the determination result (that is, channel quality of an upstream channel) of the above-described channel quality determination section 1a, the scheduler 1c performs a scheduling operation related to subchannel and slot allocations to the terminal T. The scheduler 1c allocates a coding rate or modulation scheme of packets according to the channel quality of the upstream channel. Both a slot for a downstream channel and a slot for an upstream channel are scheduled as slots.

Figure 2:
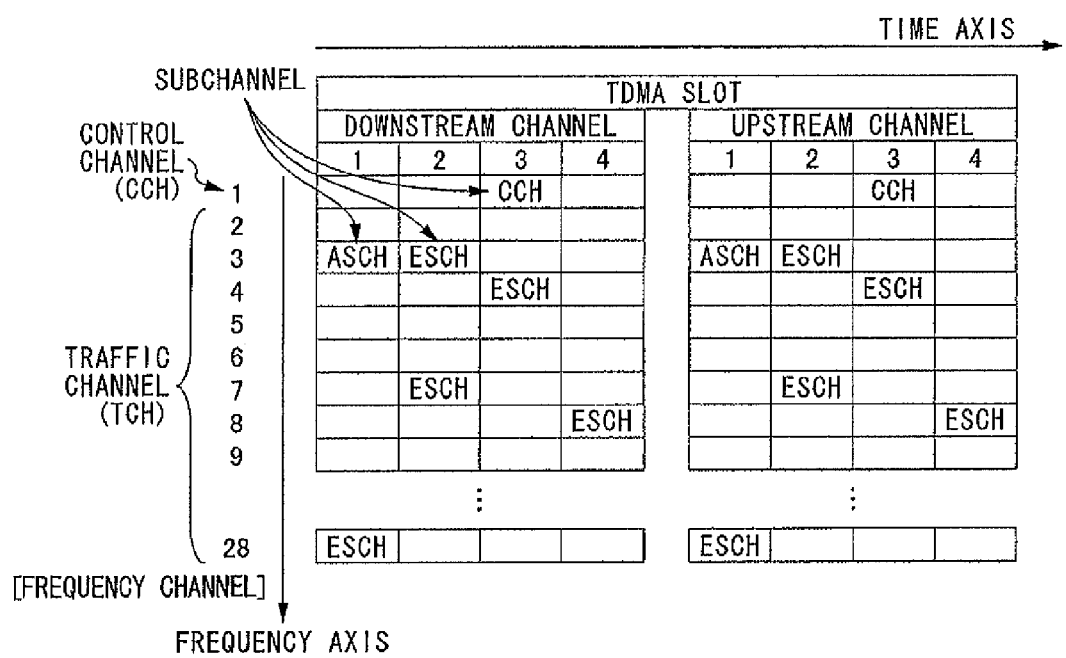
FIG. 2 is a schematic diagram showing scheduling of sub-channels and slots of the wireless communication system according to the same embodiment.

Here, the scheduling of the subchannels and the downstream and upstream channel slots in the scheduler 1c will be described in detail. As described above, the OFDMA scheme is a technology that realizes multiple accesses when a plurality of terminals T share a plurality of subcarriers in an orthogonal relationship (that is, mutual interference is absent in a correlation value of 0) and a given plurality of subcarriers are adaptively allocated to each terminal T at a given communication timing (this communication timing serves as a slot since TDMA is adopted in this embodiment) and positioned as subchannels. In FIG. 2, a relationship is shown between the subchannels and the TDMA slots. In FIG. 2, the vertical axis represents frequency and the horizontal axis represents time.

As shown in FIG. 2, one subchannel in one frequency channel is used as a shared control channel (CCH) that can be used in a predetermined period (about 100 ms) for each base station, and the remaining frequency channels are used as traffic channels (TCHs). As in the conventional PHS (PHS without use of OFDMA), four TDMA slots per frame are arranged for each of the upstream and downstream channels, and the subchannels are symmetrically used for both the upstream and downstream channels since TDD is adopted.

In this embodiment, one of the above-described TCHs is allocated as an individual control channel (hereinafter, referred to as anchor subchannel (ASCH)) to be exclusively used for the terminal T. In this embodiment, a TCH capable of being allocated for data communication is referred to as an extra subchannel (ESCH). That is, as in the conventional PHS, the CCH in this embodiment is shared between all base stations and all terminals and a period of timing at which one base station CS can use the CCH is very long (about 100 ms), but the ASCH in this embodiment is allocated from among the TCHs, so that it can be used in every frame period (5 ms). Hereinafter, schedule information of the subchannels as shown in FIG. 2 is referred to as MAP.

As in the conventional PHS, the above-described CCH is used for communication of an LCH allocation request and response, a signal reception request to the terminal T, the system's broadcast information, etc. On the other hand, the above-described ASCH is used for communication of ESCH allocation information.

The control section 1 transmits allocation information of the ASCH and ESCH, the modulation scheme, or the coding rate to the terminal T through the wireless communication section 2 on the basis of scheduling by the scheduler 1c as described above, and controls the wireless communication section 2 to perform modulation and error-correction encoding in the modulation scheme and the coding rate determined by the above-described scheduling.

Under control of the control section 1, the wireless communication section 2 error-correction encodes, modulates, and OFDMA-multiplexes a data signal or a control signal output from the control section 1, and transmits a transmission signal to the terminal T after frequency-converting the multiplexed signal (OFDMA signal) into an RF frequency band.

Figure 3:
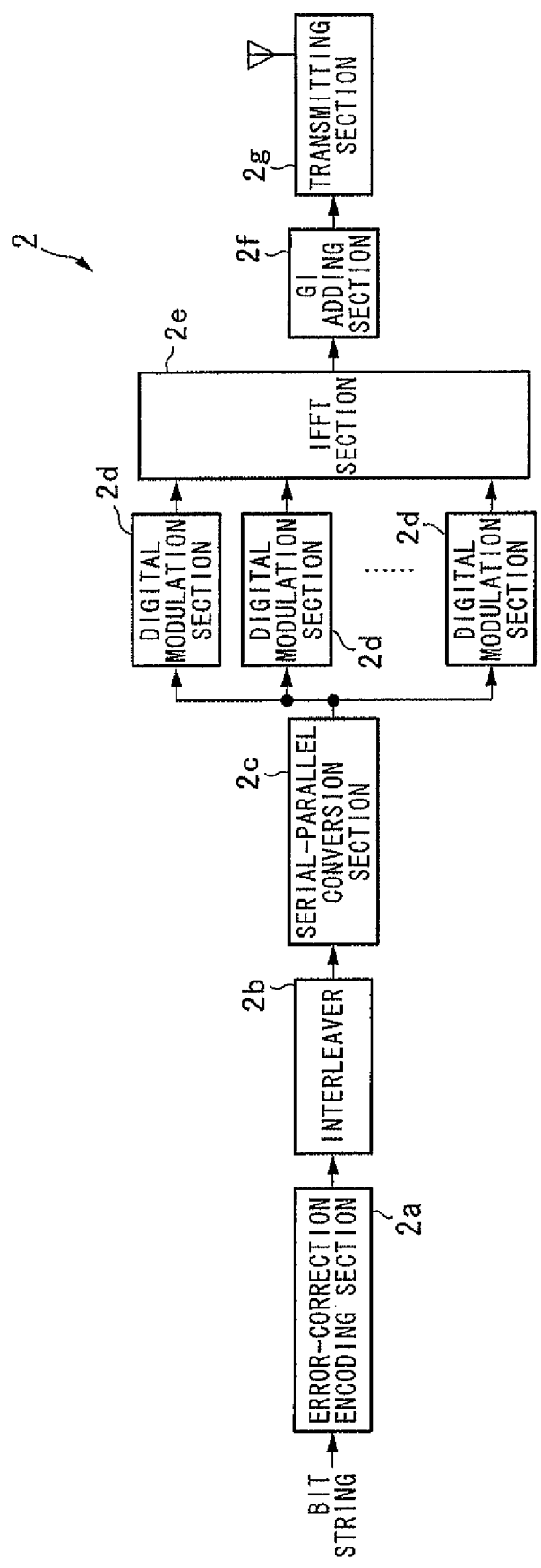
FIG. 3 is a detailed illustrative diagram of a wireless communication section 2 according to the same embodiment.

Describing more concretely, a transmitter side of the wireless communication section 2 as shown in FIG. 3 is provided with an error-correction encoding section 2a, an interleaver 2b, a serial-parallel conversion section 2c, a plurality of digital modulation sections 2d, an IFFT (Inverse Fast Fourier Transform) section 2e, a GI (Guard Interval) adding section 2f, and a transmitting section 2g.

The error-correction encoding section 2a is, for example, an FEC (Forward Error Correction) encoder to add an error correction code as redundant information to a bit string of a data signal or a control signal input from the control section 1 on the basis of a coding rate allocated by the scheduler 10 and output it to the interleaver 2b.

The interleaver 2b performs an interleaving process for the bit string to which the error correction code is added by the above-described error-correction encoding section 2a.

The serial-parallel conversion section 2c divides the bit string after the above-described interleaving process in a bit unit for every subcarrier included in the ASCH or ESCH allocated by the scheduler 1c and outputs it to the digital modulation section 2d.

The digital modulation sections 2d whose number is the same as the number of subcarriers are arranged to digitally modulate bit data divided for each subcarrier by using a subcarrier corresponding to the bit data and output a modulation signal to the IFFT section 2e. Each digital modulation section 2d performs digital modulation using a modulation scheme allocated by the scheduler 1c, for example, BPSK (Binary Phase Shift Keying), QPSK (Quadrature Phase Shift Keying), 16 QAM (Quadrature Amplitude Modulation), 64 QAM, etc.

The IFFT section 2e generates an OFDMA signal by performing an inverse Fourier transform operation and an orthogonal multiplexing operation on the modulation signal input from each digital modulation section 2d, and outputs the OFDMA signal to the GI adding section 2f.

The GI adding section 2f adds a guard interval (GI) to the OFDMA signal input from the IFFT section 2e and outputs it to the transmitting section 2g.

The transmitting section 2g frequency-converts the OFDMA signal input from the GI adding section 2f into an RF frequency band and transmits a transmission signal to the terminal T.

On the other hand, although not shown, a receiver side of the wireless communication section 2 is provided with components for performing an inverse operation to the above-described transmitter side. That is, the receiver side of the wireless communication section 2 extracts a reception OFDMA signal by frequency-converting a reception signal received from the terminal T into an IF frequency band, removes a guard interval from the reception OFDMA signal, and reconfigures and outputs a bit string to the control section 1 by performing an FFT process, a digital decoding process, a parallel-serial conversion process, a deinterleaver process, and an error-correction decoding process.

Referring back to FIG. 1, the storage section 3 stores a base station control program to be used in the above-described control section 1 or other various data, and has a function as a buffer to be used for flow control, retransmission control, etc. in the control section 1.

Next, the configuration of the terminal T will be described. As shown in FIG. 1, the terminal T is provided with a communication control section 10 (communication control unit), a wireless communication section 11, an operating section 12, a display section 13, and a storage section 14. The communication control section 10 is provided with a channel requesting section (channel requesting unit) 10a as its functional element.

In the terminal T, the communication control section 10 controls an overall operation of the terminal T on the basis of a reception signal acquired through a terminal control program stored in the storage section 13 or the wireless communication section 11 and an operation signal input from the operating section 12.

In the communication control section 10, when a communication request is received from an upper control unit of its own terminal (for example, an application of an upper layer protocol operating in the control section 10) or the base station CS, the channel requesting section 10a generates an ASCH allocation request signal for requesting the base station CS to allocate an ASCH and transmits the ASCH allocation request signal to the base station CS through the wireless communication section 11. The above-described CCH is used to transmit the ASCH allocation request signal.

The communication control section 10 performs control information communication by wirelessly connecting the above-described ASCH allocated from the base station CS, and performs data communication with the base station CS by wirelessly connecting an ESCH for data communication indicated by ESCH allocation information obtained from the base station CS through the above-described ASCH.

Under control of the communication control section 10, the wireless communication section 11 error-correction encodes, digitally modulates, and OFDMA-multiplexes a data signal or a control signal output from the communication control section 10, and transmits a transmission signal to the base station CS after frequency-converting the multiplexed signal (OFDMA signal) into an RF frequency band. A subchannel, a modulation scheme, and a coding rate to be used in the wireless communication section 11 are allocated by the base station CS (specifically, the scheduler 1c). Since the configurations of a transmitter side and a receiver side of the wireless communication section 11 are the same as those of the wireless communication section 2 in the above-described base station CS, their descriptions are omitted.

The operating section 12 is configured from operation keys such as a power key, various function keys, a numeric keypad, etc., and outputs an operation signal based on an operation input by these operation keys to the communication control section 10.

The display section 13 is, for example, a liquid crystal monitor, an organic EL monitor, etc., and displays a predetermined image on the basis of a display signal input from the communication control section 10.

The storage section 14 stores a terminal control program to be used in the above-described communication control section 10 or other various data, and has a function as a buffer to be used for retransmission control, etc.

Figure 4:
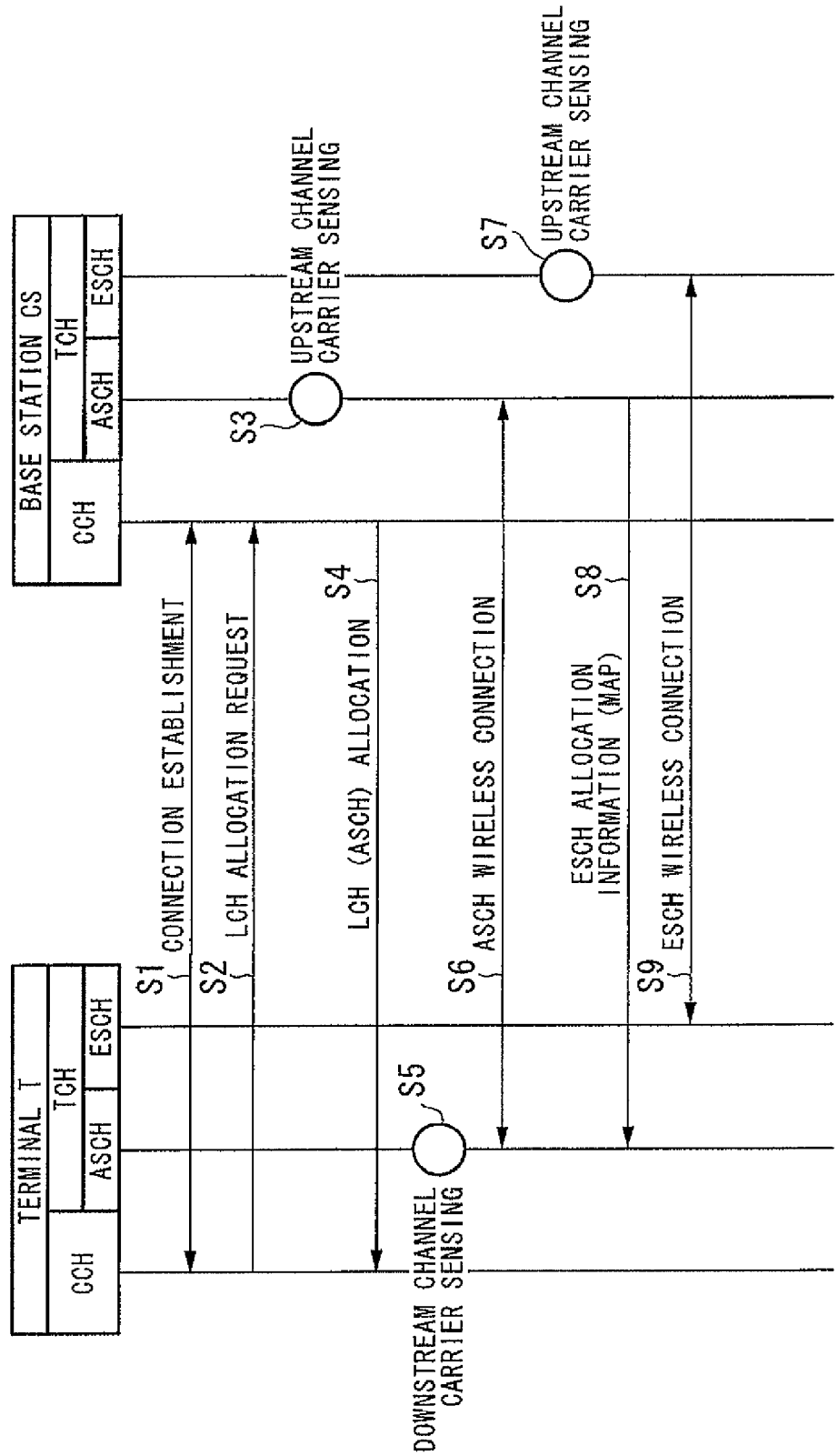
FIG. 4 is a flowchart showing an operation of the wireless communication system according to the same embodiment.

Next, the communication operation between the base station CS and the terminal T in this wireless communication system configured as described above will be described using the flowchart of FIG. 4.

First, the communication control section 10 of the terminal T monitors a signal reception response request included in a downstream channel CCH transmitted from the base station CS through the wireless communication section 11 in an idle state (standby state), monitors a signal transmission request from an upper application of its own terminal, and determines whether or not to perform signal reception or signal transmission.

Here, when the signal reception response request or signal transmission request exists, the communication control section 10 performs the transmission or reception of a control signal about synchronization with the base station CS, the exchange (negotiation) of various parameters, etc. through the wireless communication section 11, and establishes a connection with the base station CS (step S1).

The communication related to the connection establishment between the terminal T and the base station CS is performed using the CCH.

When the connection with the base station CS is established as described above, the communication control section 10 transmits an LCH allocation request signal using an upstream CCH to the base station CS through the wireless communication section 11 (step S2).

On the other hand, when the LCH allocation request signal is received through the wireless communication section 2, the control section 1 of the base station CS commands the scheduler 1c to allocate an ASCH to the terminal T. Here, the channel quality determination section 1a controls the wireless communication section 2 to perform carrier sensing of the upstream channel (for checking a use situation of the channel by carrier sensing) (step S3), determines the quality of an upstream channel of each terminal T on the basis of a quality element of each acquired upstream channel, and outputs the determination result to the scheduler 1c.

The quality element uses an RSSI obtained by carrier-sensing the channel, that is, the strength of a signal serving as an interference wave, or the like. After allocating a traffic channel (of good channel quality) considered to be an empty channel as the ASCH for the terminal T on the basis of the determination result of the above-described channel quality determination section 1a, the scheduler 1c transmits ASCH allocation information using the downstream channel CCH to the terminal T through the wireless communication section 2 (step S4).

Then, when the above-described ASCH allocation information is received through the wireless communication section 11, the communication control section 10 of the terminal T performs the acquisition of the ASCH allocated from the base station CS by carrier sensing of the downstream channel (step S5), and controls the wireless communication section 11 to perform a wireless connection of the ASCH when the acquisition is possible (step S6).

Subsequently, the channel quality determination section 1a of the base station CS controls the wireless communication section 2 to perform carrier sensing of the upstream channel (step S7), determines the channel quality of an upstream channel of each terminal T on the basis of an RSSI of a reception signal of each acquired upstream channel, and outputs the determination result to the scheduler 1c.

After allocating a traffic channel (of good channel quality) considered to be an empty channel as an ESCH for the terminal T on the basis of the determination result of the above-described channel quality determination section 1a, the scheduler 1c transmits ESCH allocation information (MAP) using the downstream channel ASCH to the terminal T through the wireless communication section 2 (step S8).

Then, when the above-described ESCH allocation information is received through the wireless communication section 11, the communication control section 10 of the terminal T controls the wireless communication section 11 to perform a wireless connection of the ESCH and perform data communication with the base station CS using the ESCH (step S9).

According to this embodiment as described above, wireless resource (band) allocation can be controlled at a very high speed by allocating one of the traffic channels as an individual control channel (ASCH) to be exclusively used for the terminal T and performing communication of a control signal (that is, ESCH allocation information) with the base station CS through the ASCH in a unit of one frame (5 ms), as compared to the conventional case where a CCH of a long period (about 100 ms) is used. Consequently, the use efficiency of wireless resources can be improved.

As described above, it is possible to realize mobile communication that can reduce transmission power and an area without requiring a cell design by adopting OFDMA to a TDMA/TDD scheme adopted by a PHS, for example, can vary bands at high speed by using an individual control channel (ASCH), and corresponds to a broad band/band variable/multiple users.

In the above-described embodiment, the ESCH allocation information is transmitted and received using the individual control channel (ASCH), but is not limited thereto. Other control information may be transmitted and received using the above-described ASCH.

A determination section (first determination unit) that determines the channel quality of an ESCH (data communication traffic channel) allocated from the base station CS may be installed in the terminal T, and the communication control section 10 may adopt a configuration in which information (RMAP) for rejecting the ESCH allocated from the base station CS is transmitted to the base station CS through the individual control channel (ASCH) on the basis of the determination result by the determination section.

In mobile communication, since the ESCH channel quality changes every moment, the RAMP is transmitted to the base station CS when the channel quality of the allocated ESCH is degraded by adopting the above-described configuration, so that a request for allocating a new ESCH whose channel quality is good may be made.

In the above-described embodiment, a next-generation broadband mobile communication system adopting orthogonal frequency division multiple access (OFDMA) as a multiple access technology in addition to time division multiple access (TDMA) and time division duplex (TDD) has been illustrated as a wireless communication system, but this wireless communication system is not limited thereto. Any wireless communication system for performing communication using a shared control channel that can be used in a predetermined period for each base station and a plurality of traffic channels that can be adaptively allocated to each wireless communication terminal is applicable.

INDUSTRIAL APPLICABILITY

According to the present invention, in a wireless communication system for performing communication using a shared control channel that can be used in a predetermined period for each base station and a plurality of traffic channels that can be adaptively allocated to each wireless communication terminal, wireless resource (band) allocation can be controlled at a very high speed since one of the traffic channels is allocated as an individual control channel to be exclusively used for the wireless communication terminal and control information communication with the base station is performed through the individual control channel in a unit of one frame (5 ms). Accordingly, it is possible to realize mobile communication that dispenses with a cell design (to reduce transmission power and an area), can vary bands at high speed, and corresponds to a broad band/band variable/multiple users.

The invention claimed is:

1. A wireless communication system comprising:
a wireless communication terminal; and
a base station, the wireless communication terminal comprising:
 a channel requesting section that requests, through a shared control channel, the base station to allocate an individual control channel; and
 a communication control section that performs communication of control information by wirelessly connecting the individual control channel allocated by the base station; and
the base station comprising:
 a channel allocating section that adaptively allocates one of a plurality of traffic channels as the individual control channel to be exclusively used for the wireless communication terminal when a request of individual control channel allocation is received from the wireless communication terminal through the shared control channel, the channel allocating section allocating a data communication traffic channel of the plurality of traffic channels to the wireless communication terminal, and the channel allocating section transmitting, for each frame, allocation information of the data communication traffic channel to the wireless communication terminal through the individual control channel.

2. The wireless communication system of claim 1, wherein the communication control section performs data communication with the base station by wirelessly connecting the data communication traffic channel indicated by the allocation information obtained through the individual control channel.

3. The wireless communication system of claim 1, wherein the wireless communication terminal comprises a first determination section that determines channel quality of the data communication traffic channel allocated by the base station, and the communication control section transmits information for rejecting the data communication traffic channel allocated by the base station, to the base station through the individual control channel on the basis of a determination result by the first determination section.

4. The wireless communication system of claim 1, wherein the base station comprises a second determination section that determines channel quality of an upstream channel for the wireless communication terminal, and the channel allocating section determines an individual control channel and a data communication traffic channel to be allocated to the wireless communication terminal on the basis of a determination result by the second determination section.

5. A wireless communication terminal comprising:

a channel requesting section that requests a base station to allocate an individual control channel through a shared control channel; and a communication control section that performs communication of control information by wirelessly connecting the individual control channel adaptively allocated from a plurality of traffic channels by the base station, the communication control section performing data communication with the base station by wirelessly connecting a data communication traffic channel of the plurality of traffic channels which is indicated by allocation information received, for each frame, from the base station through the individual control channel, and the allocation information indicating allocation of the data communication traffic channel.

6. The wireless communication terminal of claim 5, comprising:

a first determination section that determines channel quality of the data communication traffic channel allocated by the base station, wherein the communication control section transmits information for rejecting the data communication traffic channel allocated by the base station, to the base station through the individual control channel on the basis of a determination result by the first determination section.

7. A base station comprising:

a channel allocating section that adaptively allocates, when a request for allocating an individual control channel is received from a wireless communication terminal through a shared control channel, one of a plurality of traffic channels as the individual control channel to be exclusively used for the wireless communication terminal, the channel allocating section allocating a data communication traffic channel of the plurality of traffic channels to the wireless communication terminal, the channel allocating section transmitting, for each frame, allocation information to the wireless communication terminal through the individual control channel, and the allocation information indicating allocation of the data communication traffic channel.

8. The base station of claim 7, comprising:

a determination section that determines channel quality of an upstream channel for the wireless communication terminal, wherein the channel allocating section determines the individual control channel and the data communication traffic channel to be allocated to the wireless communication terminal, on the basis of a result of determination performed by the determination section.

9. A wireless communication method for a base station, comprising:

receiving a request for allocating an individual control channel from a wireless communication terminal through a shared control channel;

adaptively allocating one of a plurality of traffic channels as the individual control channel to be exclusively used for the wireless communication terminal;

allocating a data communication traffic channel of the plurality of traffic channels to the wireless communication terminal; and transmitting, for each frame, allocation information of the data communication traffic channel to the wireless communication terminal through the individual control channel.

* * * * *